United States Patent
Tsai et al.

(10) Patent No.: US 7,750,261 B2
(45) Date of Patent: Jul. 6, 2010

(54) WATERPROOF KEYBOARD

(75) Inventors: Ching Cheng Tsai, Taipei Hsien (TW);
Chia Hsin Chen, Taipei Hsien (TW)

(73) Assignee: Chicony Electronics Co., Ltd., Taipei Hsien (TW)

( * ) Notice: Subject to any disclaimer, the term of this patent is extended or adjusted under 35 U.S.C. 154(b) by 329 days.

(21) Appl. No.: 12/078,222

(22) Filed: Mar. 28, 2008

(65) Prior Publication Data

US 2009/0057113 A1    Mar. 5, 2009

(30) Foreign Application Priority Data

Aug. 31, 2007   (TW) .............................. 96132471 A (51) Int. Cl.
*H01H 13/70*   (2006.01)
(52) U.S. Cl. .................... 200/302.2; 200/5 A
(58) Field of Classification Search ................. 200/5 A, 200/517, 344, 345, 302.1–302.3; 400/490–496
See application file for complete search history.

(56) References Cited

U.S. PATENT DOCUMENTS

| | | | |
|---|---|---|---|
| 5,969,644 A * | 10/1999 | Koutaka | 341/22 |
| 6,312,176 B2 * | 11/2001 | Kageyama et al. | 400/472 |
| 6,644,874 B2 * | 11/2003 | Tsai | 400/490 |
| 7,012,206 B2 * | 3/2006 | Oikawa | 200/302.1 |
| 7,045,722 B2 * | 5/2006 | Tsai | 200/5 R |
| 7,535,699 B2 * | 5/2009 | Hamada et al. | 361/679.08 |

* cited by examiner

*Primary Examiner*—Michael A Friedhofer
(74) *Attorney, Agent, or Firm*—Bacon & Thomas, PLLC (57) ABSTRACT

A waterproof keyboard comprises: keys, an elastic rubber layer, a circuit board layer, a bottom board, and a sealing layer. The keys are mounted on the bottom board on which a plurality of apertures are disposed, and the sealing layer is disposed under the bottom surface of the bottom board. Corresponding to the apertures on the bottom board, respective adhesives are formed on the sealing layer so as to firmly adhere the sealing layer to the bottom surface of the bottom board.

10 Claims, 12 Drawing Sheets

WATERPROOF KEYBOARD

BACKGROUND OF THE INVENTION

1. Field of the Invention

The present invention relates to a keyboard, and more particularly to a waterproof keyboard that prevents liquid from flowing to the motherboard.

2. Description of the Related Art

Figure 1:
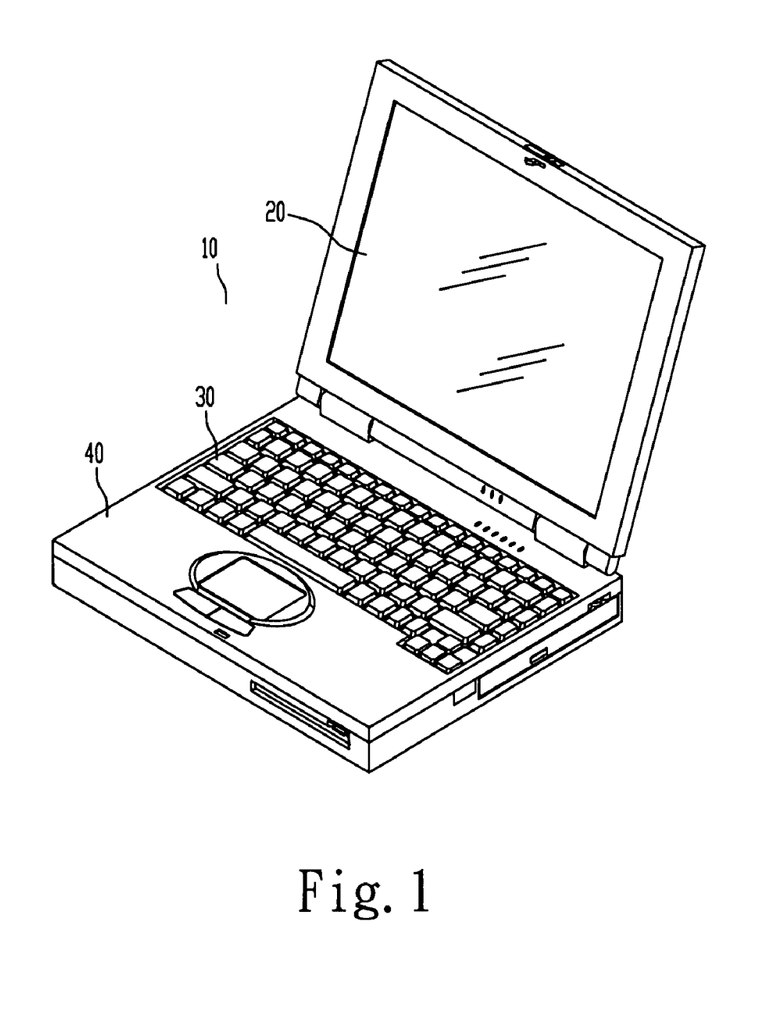
FIG. 1 is a front perspective view of a notebook computer with a raised display screen.

A general notebook computer 10, as shown in FIG. 1, mainly comprises a display 20, a keyboard 30 and a base 40, wherein the display 20 and the base 40 are integrally connected by a hinge. The keyboard 30 is installed on the base 40 which encloses a motherboard. The motherboard has CPU and other electronic components adhered onto the surface, and is located under the keyboard 30.

Figure 2:
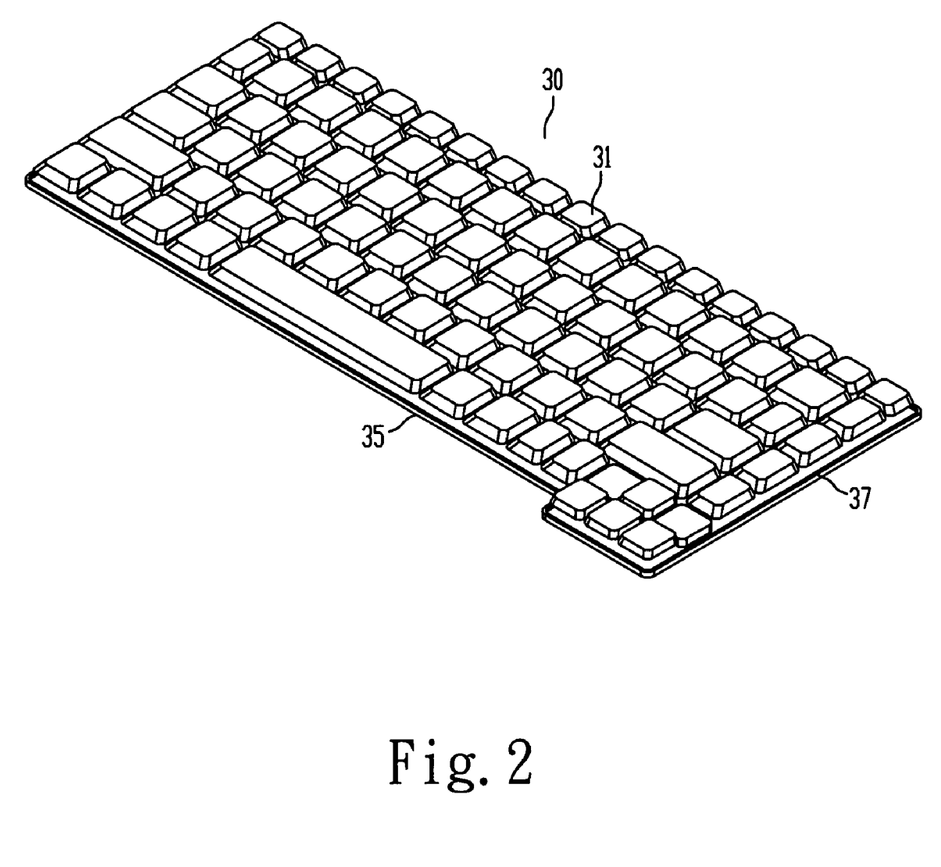
FIG. 2 is a front perspective view of a prior art keyboard for use in the notebook computer illustrated in FIG. 1.
Figure 3:
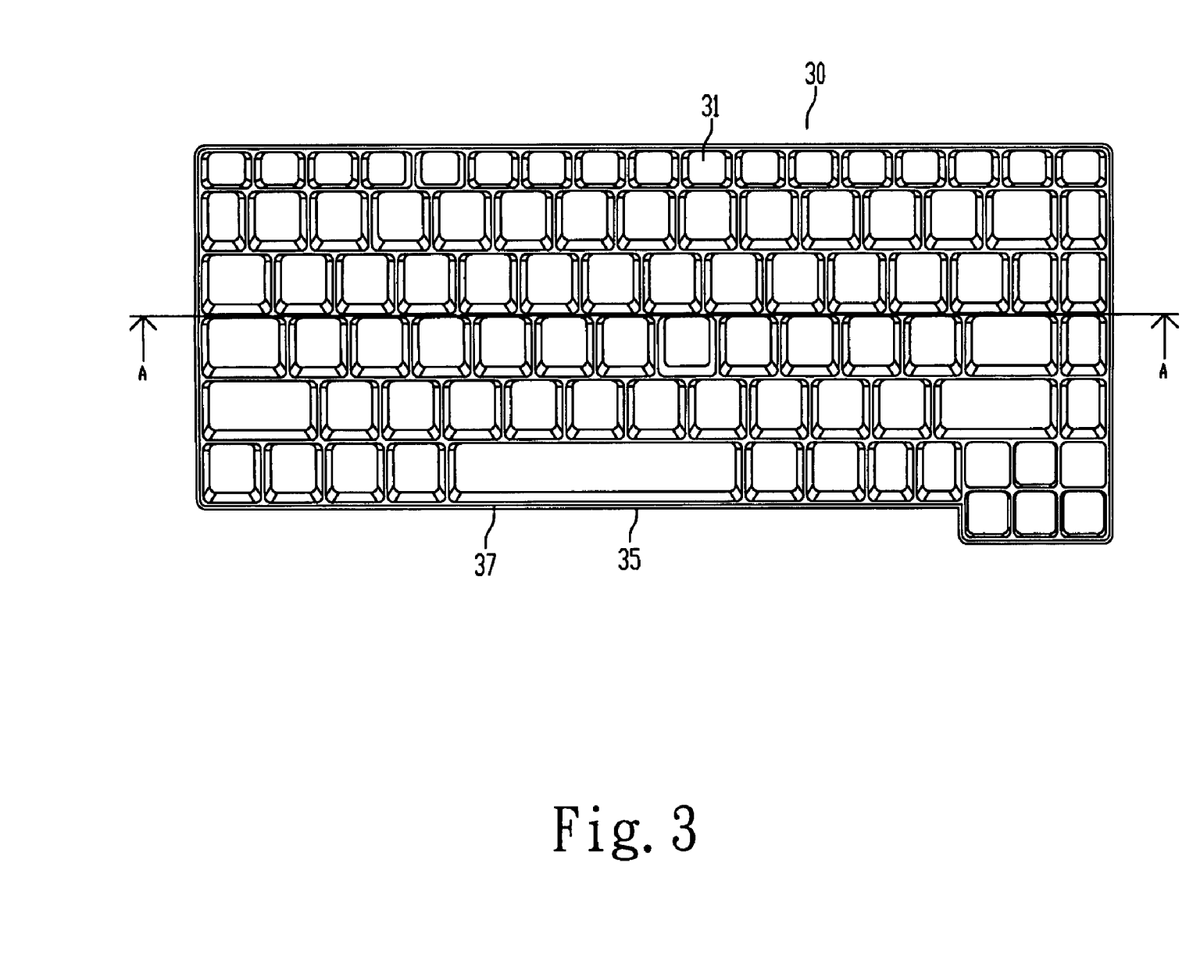
FIG. 3 is a top view of the keyboard illustrated in FIG. 2.

The keyboard 30 comprises a plurality of keys 31, a bottom board 35 having upturning edges 37, an elastic rubber layer 33, and a circuit board layer 34 (the latter two to be described below). Said elements are assembled into a keyboard module as shown in FIGS. 2 and 3 (wire distribution not shown), and then the assembled module is installed on the base 40.

The composition of the keyboard 30 is to be further elaborated in accordance with FIGS. 4 through 8.

Figure 4:
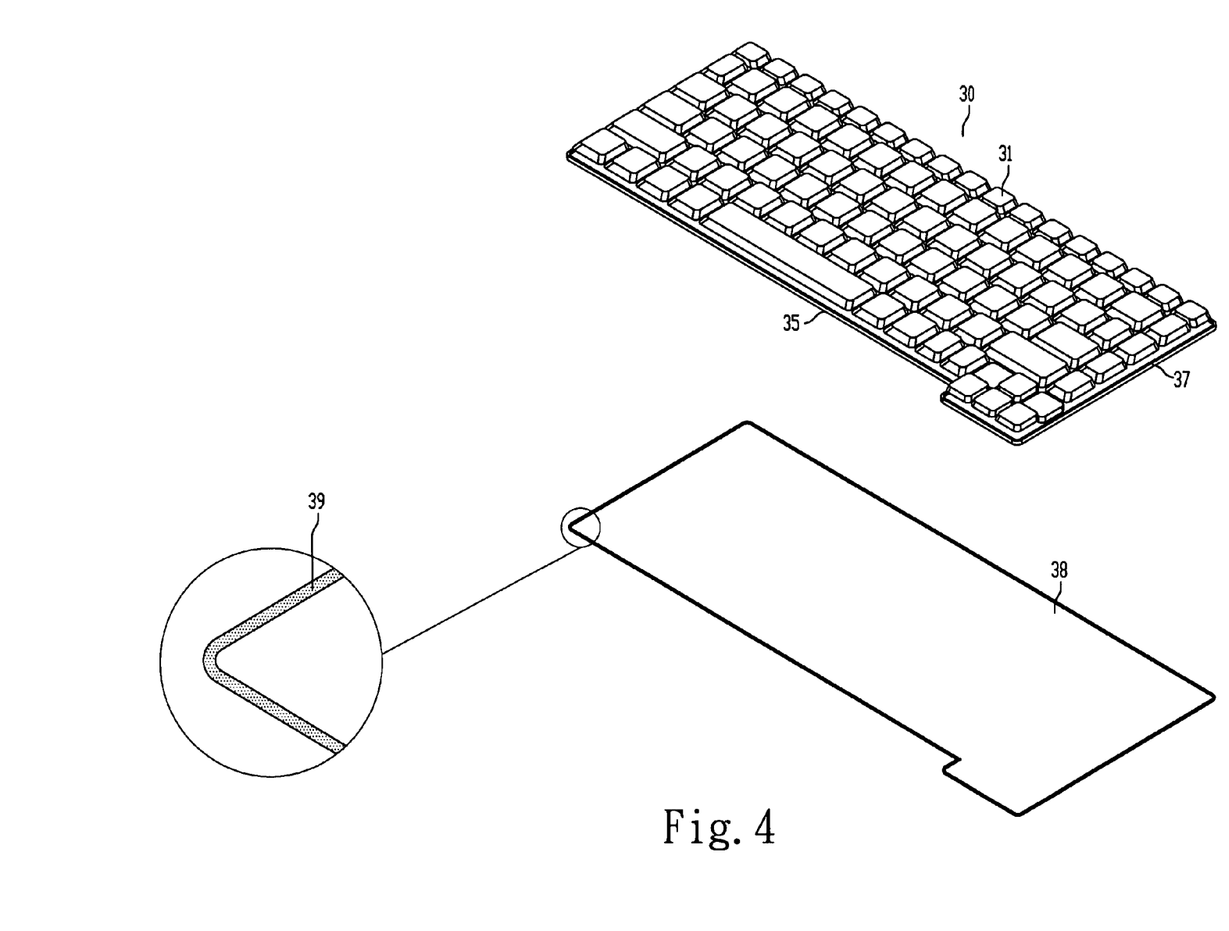
FIG. 4 is a front exploded view of the keyboard illustrated in FIG. 2, with the sealing layer detaching from the bottom board.
Figure 5:
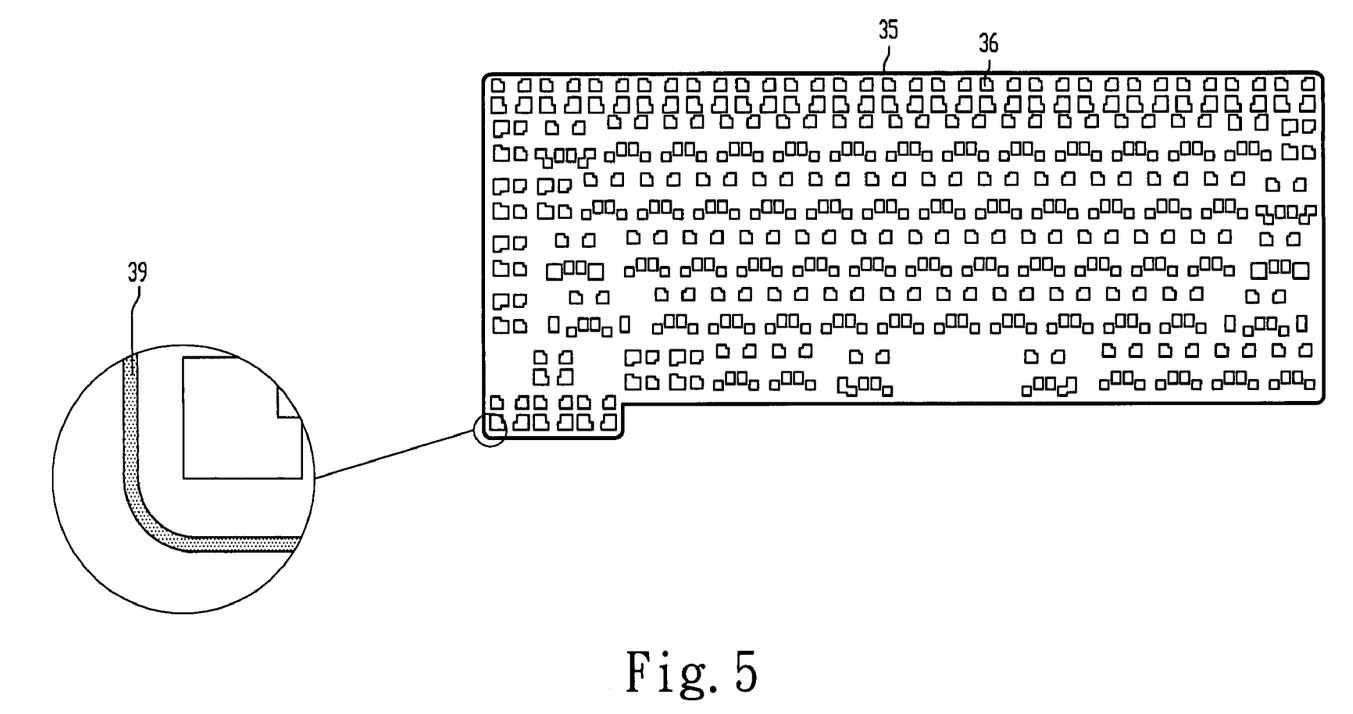
FIG. 5 is a bottom view of the bottom board illustrated in FIG. 4.
Figure 6:
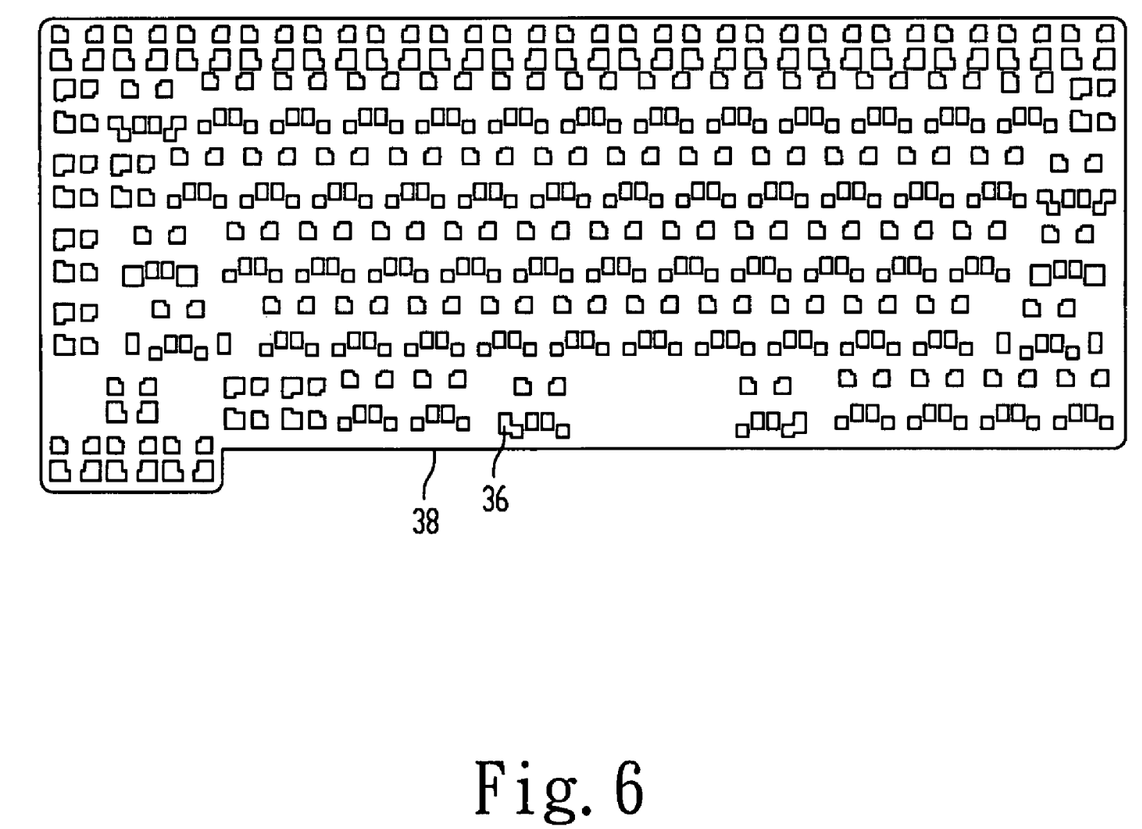
FIG. 6 is a bottom view of the bottom board illustrated in FIG. 4, with the sealing layer adhering to the bottom board.
Figure 7:
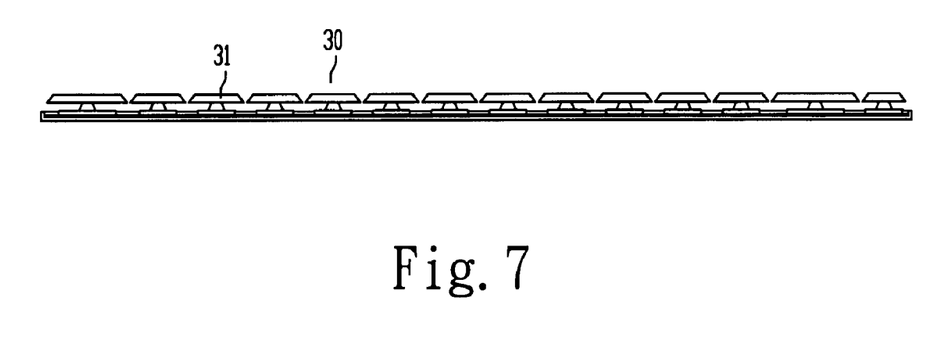
FIG. 7 is a cross-sectional view taken along line A-A of the keyboard illustrated in FIG. 3.
Figure 8:
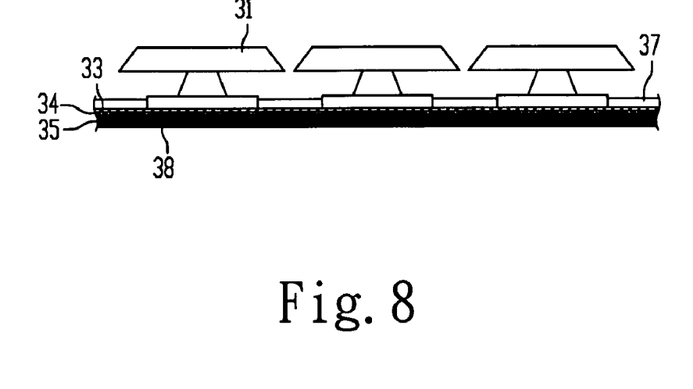
FIG. 8 is a partial enlarged view of the keyboard illustrated in FIG. 7.

FIG. 4 shows a keyboard 30 wherein a sealing layer 38 detaches from (i.e., not yet adhered) a bottom board 35, on which a plurality of keys 31 are mounted. The shape of the sealing layer 38 chiefly corresponds to that of the bottom board 35. The sealing layer 38 can be made of soft or hard plastic materials. Referring to FIG. 5, a plurality of apertures 36 are formed, through techniques like pressure-punching, on the bottom board 35 of FIG. 4. During the pressure-punching process, lugs (not shown) are also formed to lock and fix an elastic rubber layer 33 and a circuit board layer 34. The bottom board 35 in FIG. 4 and the sealing layer 38 in FIG. 5 adhere together by applying glue 39 to the bottom surface edges of the bottom board 35, or to the top surface edges of the sealing layer 38, as shown in FIG. 6. The keyboard 30, to which the sealing layer 38 adheres, then needs to go through a heating process so that the glue is solidified to unite the sealing layer 38 and the bottom board 35. After the heating process, a module of the keyboard 30 as shown in FIG. 2 is formed. Referring to cross-sectional views of the keyboard in FIGS. 7 and 8, it is understood that the keyboard 30, from the top down, mainly includes the keys 31, the elastic rubber layer 33, the circuit board layer 34, the bottom board 35 and the sealing layer 38. Since composition of the keyboard 30 is a conventional art, its detailed structure is not to be elaborated herein.

A notebook computer 10 (as shown in FIG. 1), with its compact and portable features, is generally more expensive than a desktop personal computer. There are chances that the user inadvertently spills liquid, such as drinks, on the keyboard 30 when using a notebook computer. To prevent liquid from draining through the keyboard 30 and causing damage to a notebook computer, which is often of a higher price, the conventional keyboard 30 generally comprises a sealing layer 38 disposed under the bottom surface of a bottom board 35 so as to make the keyboard 30 waterproof. With the impermeable sealing layer 38 shutting apertures 36 on the bottom board 35, a further flow of the inadvertently spilled liquid is cut off. The liquid stays on the bottom board 35 and stops flowing to the underlying motherboard through the apertures 36 on the bottom board 35. As a result, it can be assured that the liquid will not damage the motherboard, and the notebook computer maintains a normal operation.

Since keys 31 need to bear the finger pressing forces from the user, the bottom board 35 that carries the keys 31 should be made of rigid and durable materials, such as metallic materials, so as to prevent the keyboard 30 from distortion. As to the sealing layer 38, it should be made from thin sheets of certain waterproof substance that does not increase the overall thickness.

Figure 9:
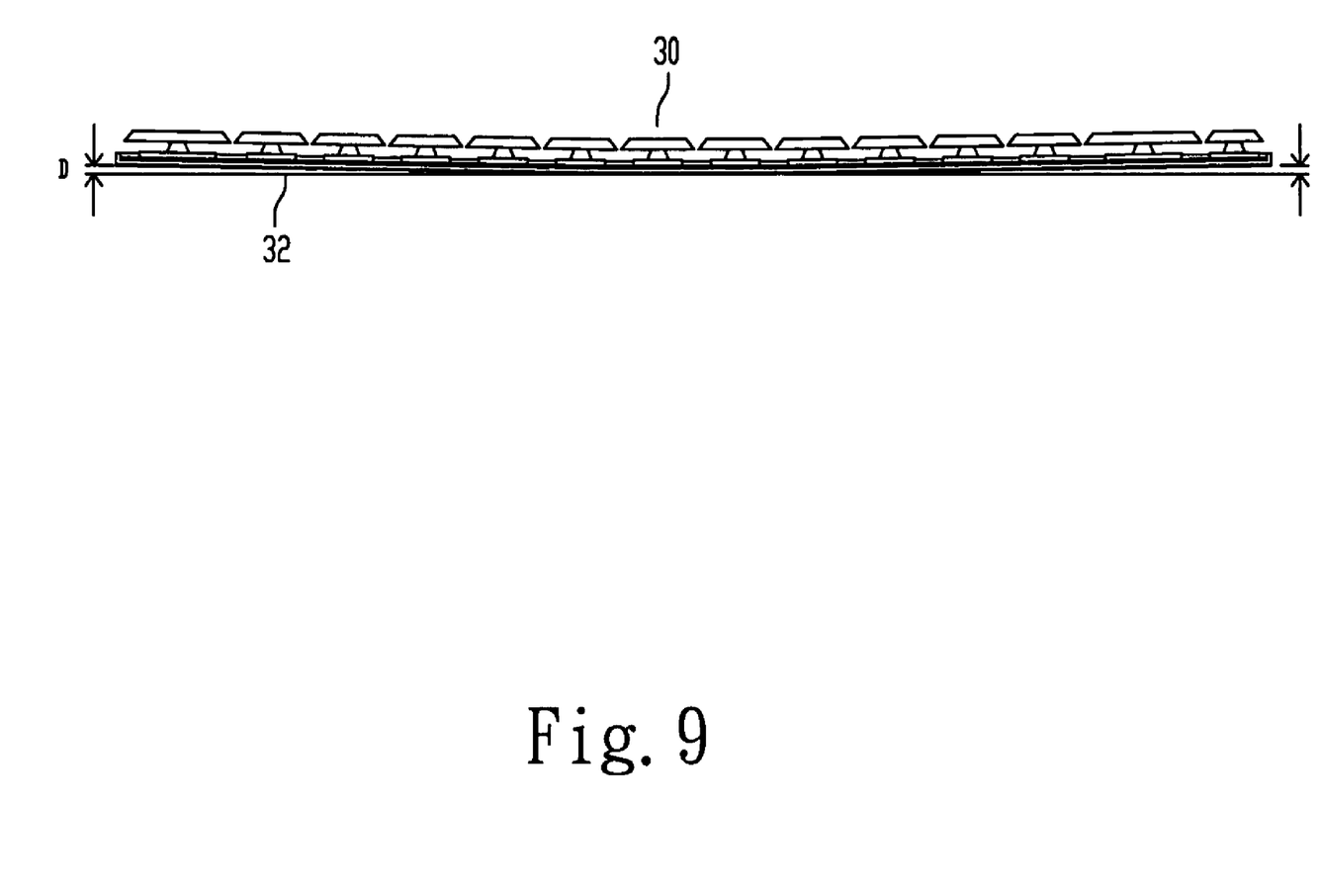
FIG. 9 is a schematic view showing distortion of a prior art keyboard after a heating process.

However, it should be noted that glue is used for uniting the sealing layer 38 and the bottom surface of the bottom board 35, with each of them having a size of at least 10 cm×27 cm. Since the substances of the sealing layer 38 and of the bottom board 35 have different thermal expansion coefficients, distortion resulting from thermal expansion may occur after the heating process, as shown in FIG. 9 (cf. FIG. 7 where the bottom of the keyboard remains a horizontal flat plate). The thermal expansion causes both ends of the keyboard 30 to elevate a bit and generates a cleft, which is of difference D in height, between the bottom board 35 and the horizontal line 32. That is to say, the sealing layer and the bottom board 35 cannot unite completely. Once too much liquid is spilled over and flows to the keyboard 30, the liquid may not be drained away but stay in the cleft between the sealing layer 38 and the bottom board 35, or the liquid may flow along the cleft to the motherboard underneath, causing damage that hinders the motherboard from normal operation.

In short, the bottom board and the sealing layer use two different substances that have different thermal expansion coefficients, and thus, distortion of the keyboard may occur after the heating process. The distortion prevents the sealing layer and the bottom board from uniting completely, allows liquid to flow to the motherboard under the keyboard, and causes damage that hinders the motherboard from normal operation. It is, therefore, necessary for the related industry to solve this technical problem.

SUMMARY OF THE INVENTION

An objective of the present invention is to provide a waterproof keyboard which prevents inadvertently spilled liquid from flowing to the motherboard underneath that results in damage to the motherboard.

Another objective of the present invention is to provide a waterproof keyboard which overcomes the drawback of distortion to a prior art keyboard comprising a bottom board and a sealing layer. The distortion results from the different coefficients of thermal expansion due to different substances used for the bottom board and the sealing layer, and prevents them from uniting completely after a heating process.

A waterproof keyboard which attains the above objectives comprises: keys, an elastic rubber layer, a circuit board layer, a bottom board, and a sealing layer. The keys are mounted on the bottom board on which a plurality of apertures are disposed, and the sealing layer is disposed under the bottom surface of the bottom board. Corresponding to the apertures on the bottom board, respective adhesives are formed on the sealing layer so as to firmly adhere the sealing layer to the bottom surface of the bottom board.

The respective adhesives on the sealing layer are placed around the edges of each aperture on the bottom board.

The respective adhesives on the sealing layer are placed by covering the edges of each aperture on the bottom board.

The respective adhesives on the sealing layer are formed by a printing technique.

The respective adhesives on the sealing layer are glues.

Another waterproof keyboard which attains the above objectives comprises: keys, an elastic rubber layer, a circuit board layer, a bottom board, and a sealing layer. The keys are mounted on the bottom board on which a plurality of apertures are disposed. The sealing layer is disposed under the bottom surface of the bottom board, and is further divided into a plurality of areas corresponding to the apertures on the bottom board. Respective adhesives are formed at the plurality of areas on the sealing layer so as to firmly adhere the sealing layer to the bottom surface of the bottom board.

The respective adhesives on the sealing layer are placed around the edges of each area.

The respective adhesives on the sealing layer are placed by covering the whole of each area.

The respective adhesives on the sealing layer are formed by a printing technique.

The respective adhesives on the sealing layer are glues.

A waterproof keyboard of the present invention, by disposing on the sealing layer the respective adhesives, which correspond to the apertures on the bottom surface of the bottom board, enables the sealing layer and the bottom board to unite more firmly. This effectively overcomes the drawback of distortion to a prior art keyboard, the distortion resulting from the different coefficients of thermal expansion due to different substances used for the bottom board and the sealing layer. Besides, the distortion prevents the sealing layer and the bottom board of the prior art keyboard from uniting completely, allows liquid to flow to the motherboard under the keyboard, and causes damage that hinders the motherboard from normal operation.

DETAILED DESCRIPTION OF THE PREFERRED EMBODIMENT

Figure 10:
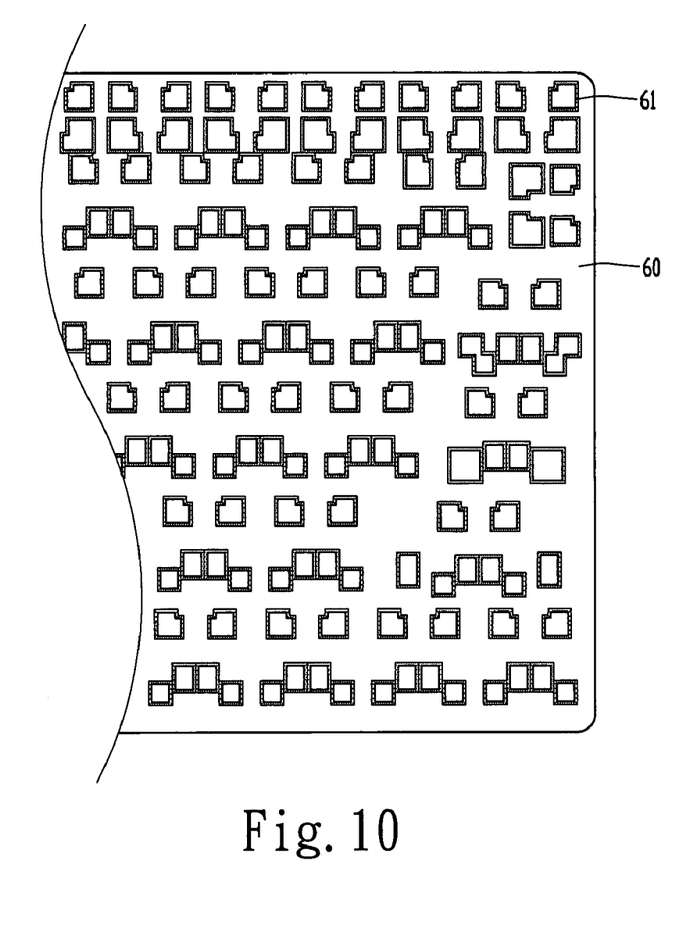
FIG. 10 is a top view of a sealing layer of the waterproof keyboard according to a first embodiment of the present invention.
Figure 11:
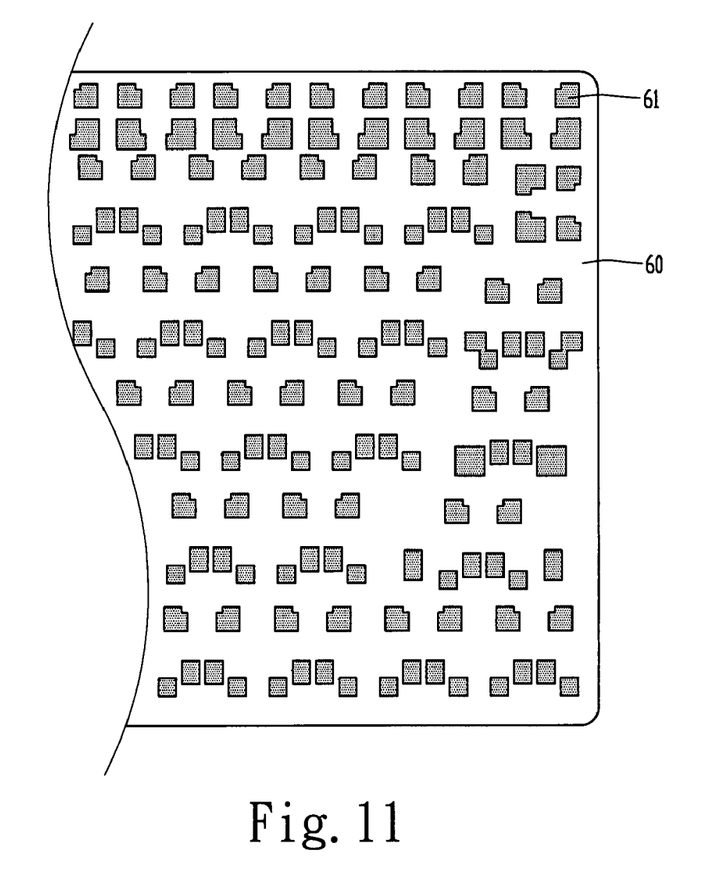
FIG. 11 is a top view of a sealing layer of the waterproof keyboard according to a second embodiment of the present invention.
Figure 12:
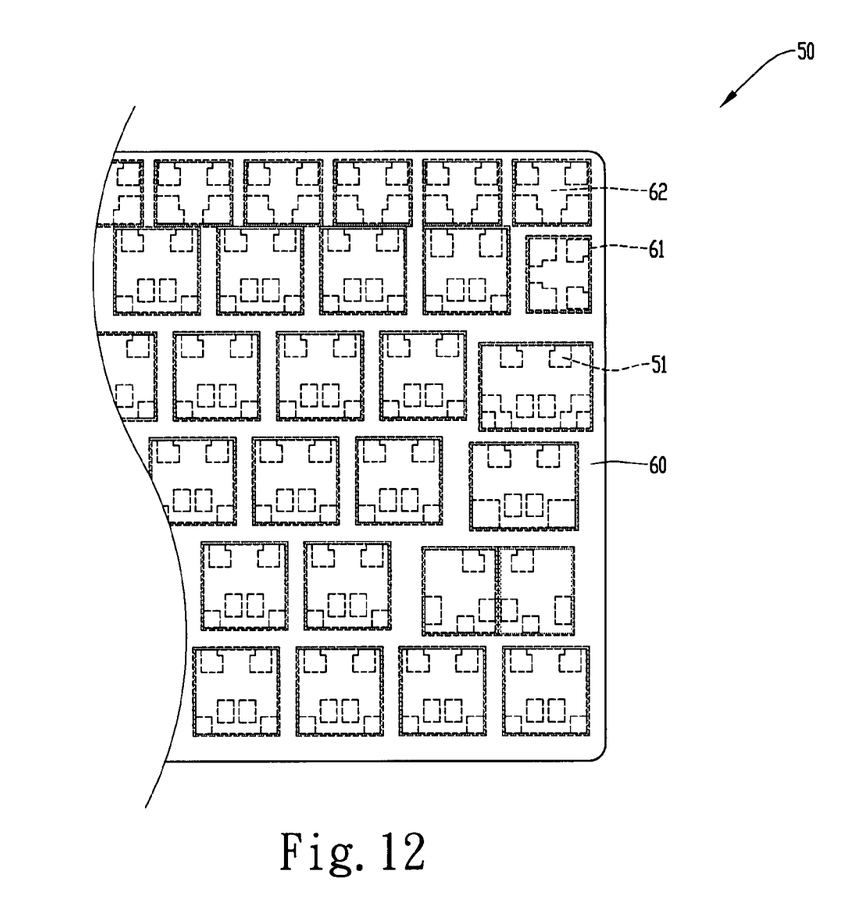
FIG. 12 is a bottom view of a waterproof keyboard according to a third embodiment of the present invention.
Figure 13:
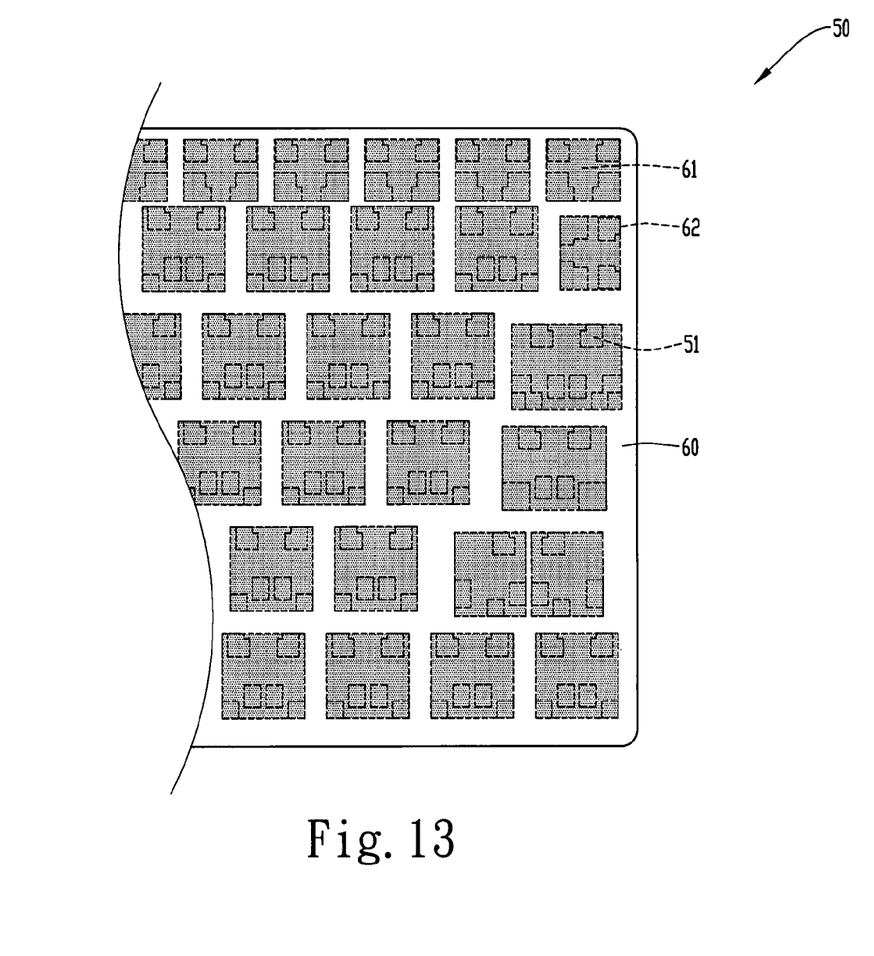
FIG. 13 is a bottom view of a waterproof keyboard according to a fourth embodiment of the present invention.

FIGS. 10 through 13 illustrate different embodiments of the present invention. FIGS. 10 and 11 are top views of a sealing layer of the waterproof keyboard according to the present invention. FIGS. 12 and 13 are bottom views of the sealing layer of the waterproof keyboard. Except for the sealing layer 60, the elements of the waterproof keyboard are the same as those of a prior art keyboard as shown in FIGS. 1 through 9.

FIG. 10 illustrates a first embodiment of the present invention. Respective adhesives 61 are formed on the sealing layer 60, which is disposed under the bottom surface of the bottom board, corresponding to the edges of apertures 51 (with reference to FIG. 12) on the bottom board. The respective adhesives 61 on the sealing layer are placed around the edges of each aperture on the bottom board. The plurality of adhesives 61 are disposed for adhering to the bottom board, enabling the sealing layer 60 and the bottom board to unite more firmly.

General adhering techniques are employed to dispose the plurality of adhesives 61 adhering to the edges of the apertures 51, on the sealing layer 60. Then, after a heating process, the sealing layer 60 and the bottom surface of the bottom board can unite firmly. With a prior art keyboard, the glue is applied only to the bottom surface edges of the bottom board, or to the edges of the sealing layer, and distortion may occur after the heating process, resulting from the different coefficients of thermal expansion due to different substances used for the bottom board and the sealing layer. The distortion prevents the sealing layer and the bottom board from uniting completely, and could further generate a cleft. When an excessive amount of liquid, such as drinks, is spilled inadvertently onto the keyboard, the liquid may not be drained away but stay in the cleft between the sealing layer and the bottom board 35, or the liquid may flow along the cleft to the motherboard underneath, causing damage that hinders the motherboard from normal operation. Nonetheless, with the waterproof keyboard of the present invention, the above problems could be solved.

FIG. 11 illustrates a second embodiment of the present invention. Respective adhesives 61 are formed on the sealing layer 60, which is disposed under the bottom surface of the bottom board, corresponding to the apertures 51 (with reference to FIG. 12) on the bottom board. The respective adhesives 61 on the sealing layer are disposed to cover each of the apertures on the bottom board. The plurality of adhesives 61 are disposed for adhering to the bottom board, enabling the sealing layer 60 and the bottom board to unite firmly. This adhesive disposition method can produce an effect equivalent to that of the embodiment illustrated in FIG. 10.

FIG. 12 illustrates a third embodiment of the present invention. A sealing layer 60 of the waterproof keyboard is disposed under the bottom surface of the bottom board. The sealing layer is divided into a plurality of areas 62 corresponding to a plurality of apertures 51 on the bottom board. Respective adhesives 61 are disposed at each of the areas 62 by surrounding its edges, enabling the sealing layer 60 to adhere firmly to the bottom surface of the bottom board. This adhesive disposition method can produce an effect equivalent to that of the embodiment illustrated in FIG. 10.

FIG. 13 illustrates a fourth embodiment of the present invention. A sealing layer 60 of the waterproof keyboard is disposed under the bottom surface of the bottom board. The sealing layer is divided into a plurality of areas 62 corresponding to a plurality of apertures 51 on the bottom board. Respective adhesives 61 are disposed at each of the areas 62 by covering its whole area, enabling the sealing layer 60 to adhere firmly to the bottom surface of the bottom board. This adhesive disposition method can produce an effect equivalent to that of the embodiment illustrated in FIG. 10.

In the different embodiments of the waterproof keyboard of the present invention, the adhesives can be glues or any other substances capable of adhering to both the sealing layer and the bottom board. Moreover, the adhesives on the sealing layer are formed by a printing technique.

The waterproof keyboard of the present invention enables the sealing layer and the bottom board to unite firmly by disposing the adhesives corresponding to the apertures on the bottom surface of the bottom board. This could effectively solve the problem of distortion to a prior art keyboard that results from different coefficients of thermal expansion due to different substances used for the sealing layer and the bottom board.

What is claimed is:

1. A waterproof keyboard, comprising: keys, an elastic rubber layer, a circuit board layer, a bottom board, and a sealing layer, wherein the keys are mounted on the bottom board on which a plurality of apertures are disposed and the sealing layer is disposed under the bottom surface of the bottom board, and wherein respective adhesives are formed on the sealing layer corresponding to the apertures on the bottom board so as to firmly adhere the sealing layer to the bottom surface of the bottom board.

2. The waterproof keyboard of claim 1, wherein the respective adhesives on the sealing layer are placed around the edges of each aperture on the bottom board.

3. The waterproof keyboard of claim 1, wherein the respective adhesives on the sealing layer are placed by covering the whole of each aperture on the bottom board.

4. The waterproof keyboard of claim 1, wherein the respective adhesives on the sealing layer are formed by a printing technique.

5. The waterproof keyboard of claim 1, wherein the respective adhesives on the sealing layer are glues.

6. A waterproof keyboard, comprising: keys, an elastic rubber layer, a circuit board layer, a bottom board, and a sealing layer, wherein the keys are mounted on the bottom board on which a plurality of areas of apertures are disposed; the sealing layer is disposed under the bottom surface of the bottom board and is further divided into a plurality of corresponding areas; respective adhesives are formed at the plurality of corresponding areas on the sealing layer so as to firmly adhere the sealing layer to the bottom surface of the bottom board.

7. The waterproof keyboard of claim 6, wherein the respective adhesives on the sealing layer are placed around the edges of each area.

8. The waterproof keyboard of claim 6, wherein the respective adhesives on the sealing layer are placed by covering the whole of each area.

9. The waterproof keyboard of claim 6, wherein the respective adhesives on the sealing layer are formed by a printing technique.

10. The waterproof keyboard of claim 6, wherein the respective adhesives on the sealing layer are glues.

* * * * *